United States Patent [19]
Cole et al.

[11] Patent Number: 5,650,857
[45] Date of Patent: Jul. 22, 1997

[54] BIT MAP ADJUSTMENT PRESERVING RESOLUTION

[75] Inventors: Carl Price Cole; Cuong Manh Hoang; Michael James Klein, all of Lexington; Mark Lane Mayberry, Nicholasville; John Parker Richey, Lexington, all of Ky.

[73] Assignee: Lexmark International, Inc., Lexington, Ky.

[21] Appl. No.: 627,402

[22] Filed: Apr. 4, 1996

Related U.S. Application Data

[63] Continuation of Ser. No. 206,370, Mar. 7, 1994, abandoned

[51] Int. Cl.$^6$ .................. H04N 1/21; H04N 1/40
[52] U.S. Cl. ............... 358/296; 358/298; 358/448; 382/299
[58] Field of Search .................. 358/296, 298, 358/443, 444, 447, 448, 459, 465, 471; 382/276, 299, 296, 293, 298; 395/125, 109, 102, 108, 112

[56] References Cited

U.S. PATENT DOCUMENTS

| 4,280,143 | 7/1981 | Judd | 358/260 |
| 5,020,115 | 5/1991 | Black | 382/44 |

FOREIGN PATENT DOCUMENTS

| WO93/17399 | 9/1993 | WIPO | G06K 15/22 |

OTHER PUBLICATIONS

Unknown Author, "New laser printer: Okidata introduces new 600 DPI–class output page printer; the desktop OL410e steps up print quality for individual PC users.", EDGE: Work–Group Computing Report v. 4 n 182, p. 64(1).

*Primary Examiner*—Peter S. Wong
*Assistant Examiner*—Gregory J. Toatley, Jr.
*Attorney, Agent, or Firm*—John A. Brady

[57] ABSTRACT

An electrophotographic printer (1) adjusts high resolution data while preserving the resolution capabilities of the printer. Data in a 600×600 bit map is assigned alternately to two rows of a 300×1200 bit map. Excellent visual effects are realized.

16 Claims, 5 Drawing Sheets

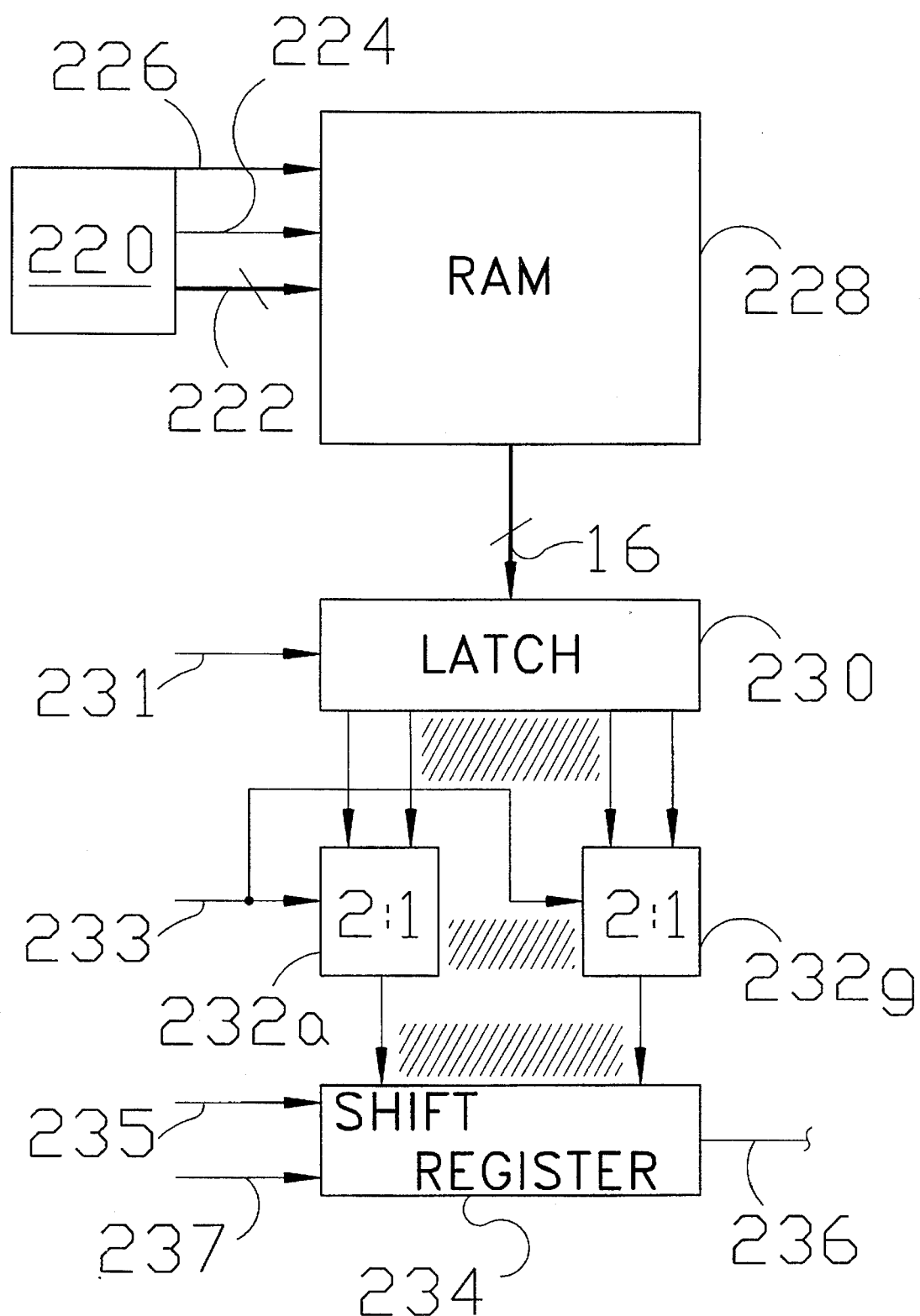

BIT MAP ADJUSTMENT PRESERVING RESOLUTION

This application is a continuation of application Ser. No. 08/206,370, filed Mar. 7, 1994, now abandoned.

TECHNICAL FIELD

This invention relates to printing and other imaging in which the image is obtained as a bit map in a first resolution and is printed as a bit map in a different resolution which is not symmetrical with the first resolution. In the specific embodiment the first resolution is 600 by 600 dots per inch and the second resolution is 300 by 1200 dots per inch.

BACKGROUND OF THE INVENTION

The term symmetric in the context of resolution here used refers to the same dimension for each bit in both row and column direction (rows and columns being orthogonal in the traditional sense). Thus, a 600×600 dots per inch bit map is symmetric since the orthogonal dimensions for each bit are the same 1/600 inch. A bit map which is increased or compressed the same proportion in both the row and column dimensions is acted upon symmetrically.

Increasing and decreasing resolution symmetrically is a common technique to compress data. U.S. Pat. Nos. 4,280,143 to Judd and 5,020,115 to Black are illustrative. Such compression or expansion seeks to maintain a close replica of the bit map while conforming it in size to the capabilities of the imaging device with which it is to be used or simply to reduce data storage requirements.

This invention is directed to conforming bit map data available to the imaging device in one resolution to the resolution capabilities of the imaging device when those capabilities are not symmetric while the data is symmetric. Specifically, the preferred embodiment data for a printer is received in bit map form in 600×600 bits per inch resolution. The printer has the capability of printing in 300×1200 dots per inch, and the received bit map is modified to use the resolution of the printer to provide excellent printing.

The printer which has the 300×1200 dots per inch capability employs a commercially available light emitting diode (LED) printhead. The full 300×1200 capability of such a printhead has been used in the prior art for gray scale printing and for printing which eliminates the stair step effect of bit map printing (termed enhancement of resolution). Enhancement of resolution involves the observation of a, for example, 300×300 data bit map for patterns characteristic of the stair step and the modification of the printing using the 1200 capability to smooth the stair steps. This invention creates a new data bit map without regard to characteristic pattern but simply by rearranging all of the bits in an original bit map in a manner not varied by the content of the bit map.

DISCLOSURE OF THE INVENTION

In accordance with this invention, a printer or other imaging device transforms image data in a first resolution into data of resolution not symmetric with the resolution of the first data. Specifically, the significance of alternating data bits in the first resolution is assigned in the same sequence to two lines of data in the second bit map. Thus, a 600×600 dots per inch data map is transformed into a 300×1200 resolution data map, with excellent final visual appearance, both of text and graphics. The 600×600 bit map is symmetric. The 300×1200 bit map has a finer resolution than the 600 bit map in the column direction (1200 to 600) and a courser resolution in the row direction (300 to 600).

This modification can be made in a host computer and transmitted to the printer, as well as made in the printer itself. The term imaging device assembly will be used in accordance with this invention to encompass both modification in the printer and modification by a host computer which transmits the result for direct use by the printer.

BRIEF DESCRIPTION OF THE DRAWING

The details of this invention will be described in connection with the accompanying drawing, in which

FIG. 5 illustrates implementation of the bit map modification by combinational logic.

BEST MODE FOR CARRYING OUT THE INVENTION

In accordance with this invention the original bit map is binary (black or white) data in 600×600 dots per inch resolution. Thus, the original data is generated on the assumption that each bit will dictate either black (or other color) or white (or contrasting color) for a square of 1/600 width and length, and these squares will be contiguous in rows and columns. Such bit maps are now widely conventional, and may be received by an imaging device 1 (FIG. 1) from a data cable 3 or generated in the imaging device from data in a page description language such as language for a PCL® interpreter (trademark of Hewlett-Packard Co.) or a PostScript® interpreter (trademark of Adobe Systems Incorporated). Depending on the page size of the data, the first predetermined number of bits (typically 4800 bits) will be those for the first line and the succeeding same number of bits will be for each succeeding line (typically 6600 lines).

Figure 1:
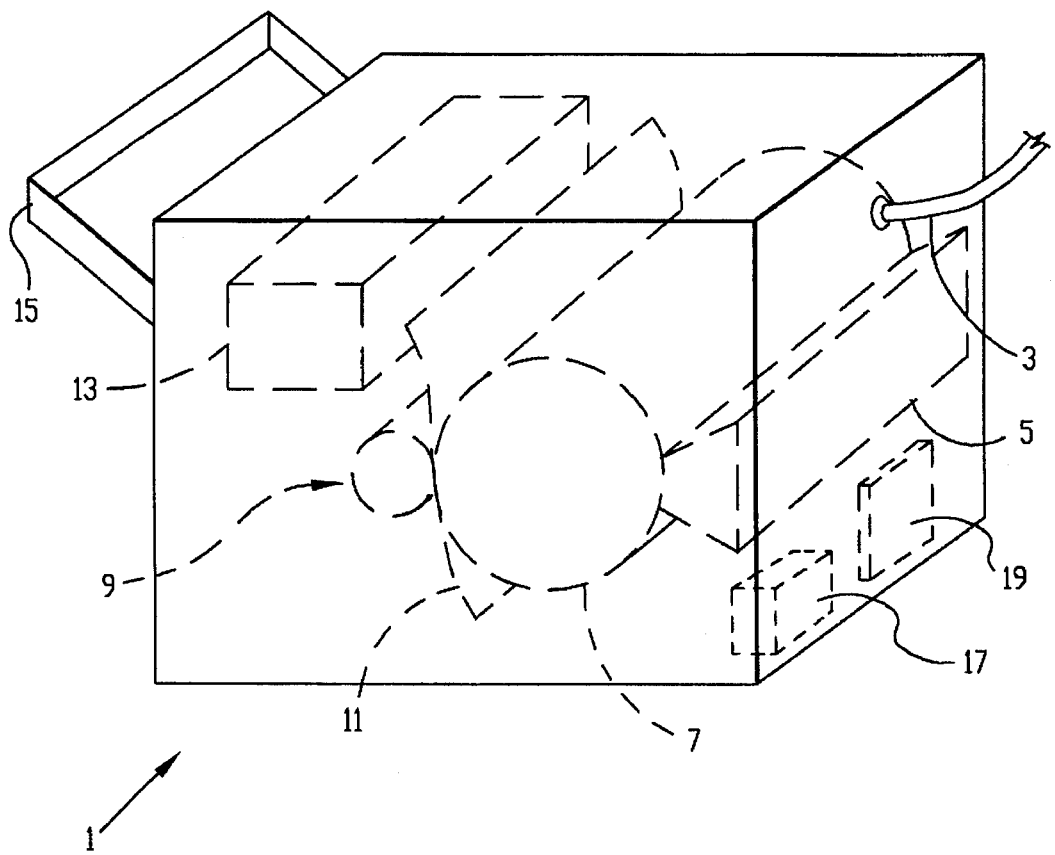
FIG. 1 is illustrative of a printer employing this invention and FIGS. 2a, 2b, 3a, 3b, 4a, and 4b illustrate original and modified bit patterns.

A typical printer is shown in FIG. 1. Page information is received by printer 1 in a standard manner from a communications cable 3. Printer 1 may be any suitable printer which has an optical system to print in the unsymmetrical resolution which this invention employs. For illustrative purposes printer 1 is shown suggestive of an electrophotographic printer having an optical system 5 operative on photoconductive drum 7. Drum 7 transfers images defined by optical system 5 at transfer station 9 to paper 11. The image is fixed, typically by heat, at fixing station 13, and the finished printed page is delivered to output tray 15.

Data processor 17 in printer 1 monitors the data received and interprets the data in accordance to the control language to which the data processor is set. Information received on cable 3, as well as other information, is stored electronically in memory 19. Data processor 17, using memory 19, modifies the bit information as described below, which information then controls optical system 5. Optical system 5 has a commercially available LED printhead capable of illuminating sections 1/300 inch wide across drum 7 and 1/1200 inch around drum 7.

Figure 2A:
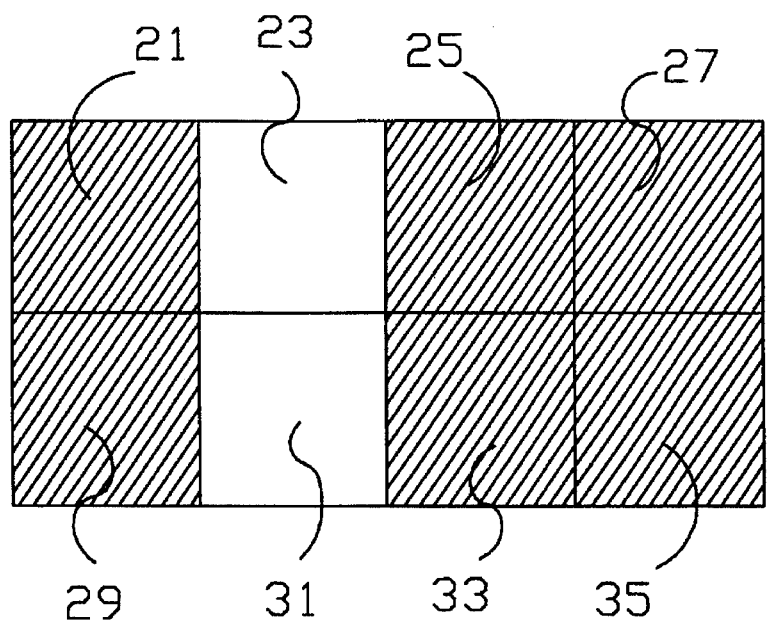

FIG. 2a shows four bits in each of two succeeding lines in the 600 by 600 resolution. In the example of FIG. 2a the left bit 21 is for black, the next bit 23 is for white, and the next two bits 25, 27 are for black. This pattern is repeated in this example for both of the two lines. Accordingly, in the next line, the left bit 29 is black, the next bit 31 is white, and the next two bits 33, 35 are black.

Figure 2B:
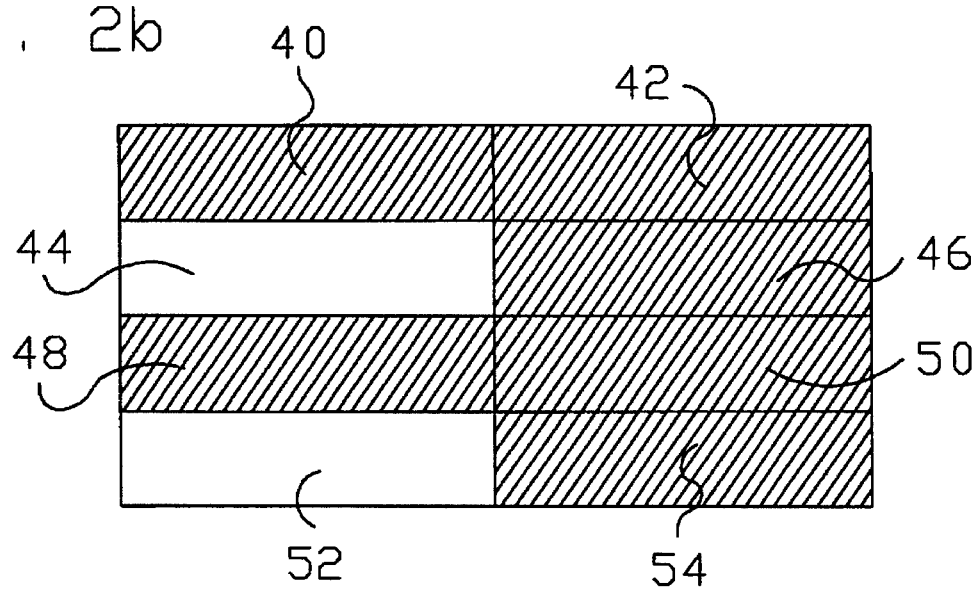

The modification scheme in accordance with this invention is to assign the value of every other bit to the second line of a 300×1200 bit map with all bit being given an assigned width of 1/300 inch. The sequence of the bit in each line of the modified bit map is the same sequence as that of the original bit map. FIG. 2b illustrates the 300×1200 bit map obtained by modifying the bit map of FIG. 2a. The bit map has four lines and each line is 1/1200 inch in height. The width of each horizontal bit is 1/300 inch. The top line has two black dots 40 and 42. Dot 40 is black because it is given the same significance as the left dot 21 in the 600×600 bit map. Dot 42 is black because it is given the same significance as the third dot from the left 25 of the 600×600 bit map. In the next row, the left dot 44 is white because it is given the same significance as the second dot 23 in the first row of the 600×600 bit map. The next dot 46 is black because it is given the significance of the fourth dot 27 in the first row of the 600×600 bit map. Similarly, in the next row dot 48 has the significance of first dot 29 in the second row of the 600×600 bit map; dot 50 has the significance of the third dot 33 of the second row of the 600×600 bit map; in the next row dot 52 has the significance of the second dot 31 in the second row of the 600×600 bit map, and dot 54 has the significance of the fourth dot 35 in the second row of the 600×600 bit map.

Figure 3A:
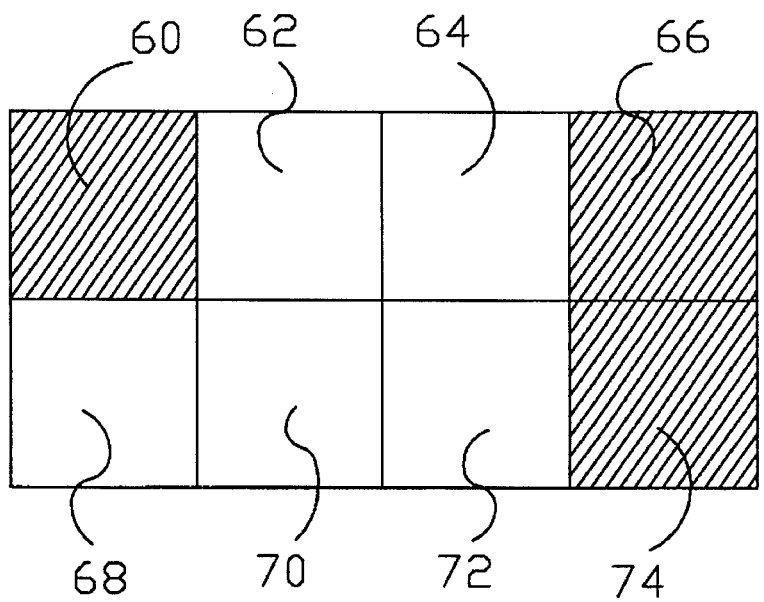
Figure 3B:
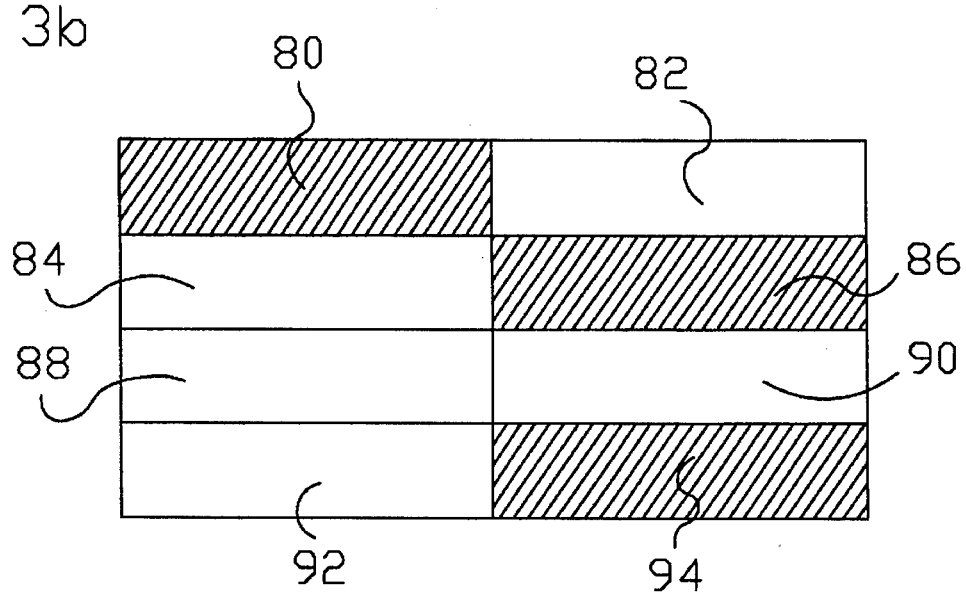

FIG. 3a illustrates a different pattern in the 600×600 bit map in which one of the two rows has a black pel only on the left and both of the two rows have a black pel on the right, with the remaining pels being white. The top row of pels is numbered, from left 60, 62, 64, and 66, and the bottom row of pels is numbered from left 68, 70, 72 and 74. The corresponding 300×1200 pel bit map is shown in FIG. 3b. As illustrated the top left pel 80 has the black significance of the top left pel 60 of the 600×600 bit map. The white significance of the next pel 62 in the top row is assigned to the left pel 84 of the next row of the 300×1200 bit map. This pattern is repeated. The next pel 82 in the top row of the 300×1200 bit map has the white significance of pel 64. The second pel 86 in the second row has the significance of pel 66. The next row has, from left, pels 88 and 90 and these are assigned the white significance of pels 68 and 72, respectively. The bottom row has, from left, pets 92 and 94, and these are assigned the white significance of pel 70 and the black significance of pel 74, respectively.

Figure 4A:
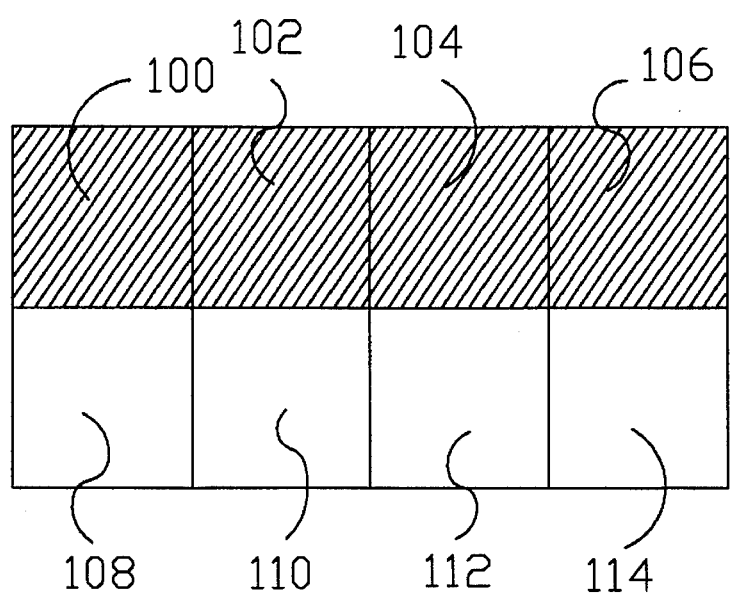
Figure 4B:
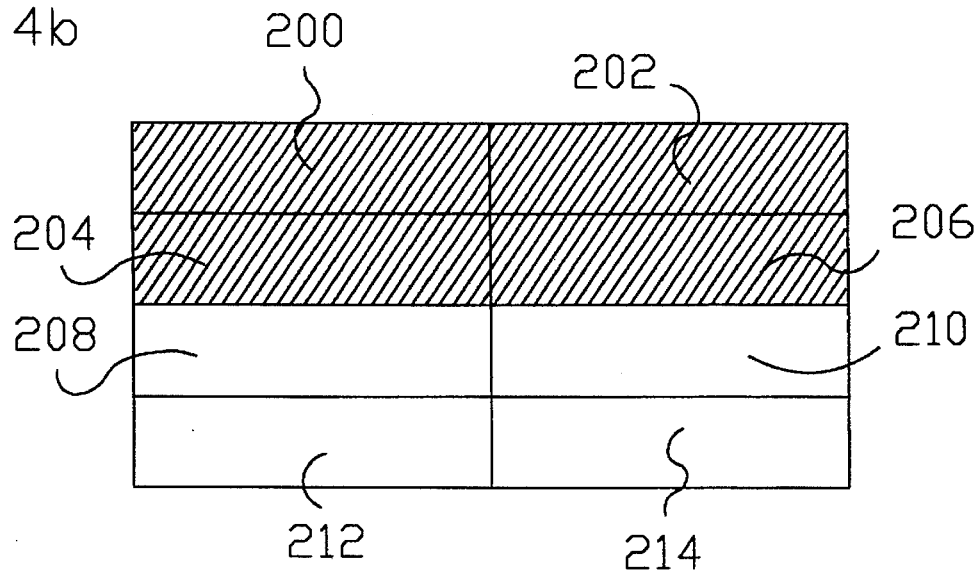

FIG. 4a shows still another representative pattern in the 600×600 bit map. The top four pels, from left, 100, 102, 104, and 106 are all black. The bottom four pels, from left 108, 110, 112 and 114 are white. FIG. 4b shows the transformation to a 300×1200 bit map in accordance with this invention. The top row, from left, pels 200 and 202 are black since they are assigned the significance of pels 100 and 104 respectively. The next row, from left pels 204 and 206 are black because they are assigned the significance of pels 102 and 106 respectively. The next two rows are all white since the third row, having pels from left 208 and 210 and assigned the significance of pets 108 and 112, respectively, and the bottom row, having pels from left 212 and 214, which are assigned the white significance of pels 110 and 114 respectively.

As shown in FIGS. 2a and 2b, a single white bit in a black pattern may not appear in the same line after adjustment. However, a proportional amount of white does appear, and a single dot surrounded by other dots at 600×600 resolution is generally not a line pattern but is a gray scale pattern, such as dithering, and preserving the proportional amount preserves the gray effect. FIGS. 3a and 3b illustrate that a two pel discontinuity in the 600 ×600 bit map is approximated in accordance with this invention and that vertical lines may alternate from black to white, but at 1/1200 inch frequency, which human vision will tend to integrate. FIGS. 4a and 4b illustrate that horizontal lines are preserved in the alteration. Overall visual effect in an LED electrostatic printer using dry toner is exceptionally good, both for text and for graphics.

The transformation in accordance with this invention is very straightforward, so much so that efficiencies in its implementation are readily available. A simple table look-up is preferred, with two tables, one to form the first line and one to form the second line of the 300×1200 bit map. The 600×600 bit map is written in 16 bit words. Each word constitutes an entry into the table. After the words in the first 600×600 row are entered, with the table giving binary output defining the first 300×1200 row, the same words are entered into the second table to obtain the binary output defining the second row of the 300×1200 bit map. This is then repeated for each word in the subsequent row of the 600×600 bit map, for both tables, and this is then repeated for the subsequent rows.

A single such table can be used, with the words of the 600×600 row shifted for the second row of the 300×1200 bit map. However, this is a large number of shifts (although only one per word), and the delay is generally less desirable than providing the two tables.

Of course, the adjustment of data can be done in software with a program which merely alternates the significance assigned to the 300×1200 bit map from alternating bits in each row of the 600×600 bit map. This would normally be the case when the modification is done in a host computer and transmitted to the printer for direct use.

Finally, of course, the transformation can be done by standard combinational logic. FIG. 5 illustrates the modification employing combinational logic in standard electronic microcircuits. The control block 220 generates address signals on bus 222 and timing signals on signal lines 224 and 226 for a dynamic random access memory 228. Memory 228 contains the 600×600 bit map in the form of data words with each bit of the data words representing one bit of the 600×600 bit map and the data words and their bits being in the sequence of the 600×600 bit map. (For example, the four bits 21, 23, 25 and 27 of FIG. 2a could be stored as four bits in sequence in a 16 bit word in memory 228.) Control block 220 first generates the address on bus 222 for the first 16 bit word in the 600×600 bit map in memory 228. This word is held in latch 230 under control of a timing signal on line 231. Subsequently, the even bits (selected by the logic 232a through 232g under control of a timing signal on line 233 in the first of two states as suggested by the notation 2:1 of FIG. 5) are passed to the 8 bit shift register 234 where they are latched under control of a timing signal on line 235. These 8 bits are then shifted on data line 236 for direct use by the printhead 5 under control of timing signals on line 237. This process continues until control block 220 reaches the end of the first row in the 600×600 bit map. Control block 222 again generates the address for the first word in the memory 228. The data is again latched in latch 230 and the odd bits (selected by the logic 232a through 232g under the control of a timing signal on line 233 in the first of two states as suggested by the notation 2:1 of FIG. 5) are stored in the 8 bit shift register 234. These bits are then shifted on line 236 to the printhead 5. Control block 220 then generates the address for the first word of the second row in the 600×600 bit map. The process proceeds as just described until the entire bit map is sent to the printhead 5.

Variations within the spirit and scope of the foregoing can be expected. Patent coverage therefore is not intended to be limited except as provided by law with particular reference to the accompanying claims.

What is claimed is:

1. An imaging device assembly having means to form a bit map for printing from a first bit map having bits in sequence defining lines of an image, the different significance of such bits defining different appearance of said image, said means to form comprising means to assign the significance of alternating bits of said lines of said first bit map to alternating lines in said bit map for printing in the sequence of said first bit map.

2. The imaging device as in claim 1 in which said first bit map is in symmetric resolution and said bit map for printing has resolution in one dimension which is finer than said symmetric resolution and resolution in the orthogonal dimension which is courser than said symmetric resolution.

3. The imaging device as in claim 2 in which said first bit map is in 600×600 dots per inch resolution and said bit map for printing is in 300×1200 resolution.

4. The imaging device as in claim 3 in which said means to form a bit map comprises table look-up means or combinational logic in a printer.

5. The imaging device as in claim 1 in which said means to form a bit map comprises table look-up means or combinational logic in a printer.

6. The imaging device as in claim 2 in which said means to form a bit map comprises table look-up means or combinational logic in a printer.

7. An imaging device assembly having means to form a bit map for printing from a first bit map, said first bit map being in m×m resolution, where m represents dots per inch and is at least in the order of magnitude of 600, the different significance of such bits defining different appearance of said image, said means to form comprising means to assign the significance of alternating bits of one dimension of said first bit map to alternating lines of said bit map for printing in the sequence of said first bit map to form an n×o bit map, in which n is less than m and o is larger than m, and printing from said bit map for printing with a printhead which prints in the resolution of n×o.

8. The imaging device as in claim 7 in which said means to form a bit map comprises table look-up means or combinational logic in a printer.

9. The imaging device as in claim 4 in which said means to form a bit map comprises a first look-up table and a second look-up table, said first and second look-up tables each receiving the same input from said first bit map, said first look-up table defining from said same input a first line in said bit map for printing and said second look-up table defining from said same input a second line in said bit map for printing.

10. The imaging device as in claim 5 in which said means to form a bit map comprises a first look-up table and a second look-up table, said first and second look-up tables each receiving the same input from said first bit map, said first look-up table defining from said same input a first line in said bit map for printing and said second look-up table defining from said same input a second line in said bit map for printing.

11. The imaging device as in claim 6 in which said means to form a bit map comprises a first look-up table and a second look-up table, said first and second look-up tables each receiving the same input from said first bit map, said first look-up table defining from said same input a first line in said bit map for printing and said second look-up table defining from said same input a second line in said bit map for printing.

12. The imaging device as in claim 8 in which said means to form a bit map comprises a first look-up table and a second look-up table, said first and second look-up tables each receiving the same input from said first bit map, said first look-up table defining from said same input a first line in said bit map for printing and said second look-up table defining from said same input a second line in said bit map for printing.

13. The imaging device as in claim 4 in which said means for form a bit map comprises combinational logic comprising a latch in which bits in a line of said first bit map are held and also comprising a shift register to which the even bits from said latch are passed and then shifted to form a first line of said bit map for printing, and to which the odd bits from said latch are passed and then shifted to form a second line of said bit map for printing.

14. The imaging device as in claim 5 in which said means for form a bit map comprises combinational logic comprising a latch in which bits in a line of said first bit map are held and also comprising a shift register to which the even bits from said latch are passed and then shifted to form a first line of said bit map for printing, and to which the odd bits from said latch are passed and then shifted to form a second line of said bit map for printing.

15. The imaging device as in claim 6 in which said means for form a bit map comprises combinational logic comprising a latch in which bits in a line of said first bit map are held and also comprising a shift register to which the even bits from said latch are passed and then shifted to form a first line of said bit map for printing, and to which the odd bits from said latch are passed and then shifted to form a second line of said bit map for printing.

16. The imaging device as in claim 8 in which said means for form a bit map comprises combinational logic comprising a latch in which bits in a line of said first bit map are held and also comprising a shift register to which the even bits from said latch are passed and then shifted to form a first line of said bit map for printing, and to which the odd bits from said latch are passed and then shifted to form a second line of said bit map for printing.

* * * * *